United States Patent
Franklin et al.

(10) Patent No.: US 7,748,235 B1
(45) Date of Patent: Jul. 6, 2010

(54) ICE CHEST COOLER AND TEMPORARY AIR CONDITIONER

(76) Inventors: Rick Franklin, 7621 Herricks Loop, Orlando, FL (US) 32835; Sherry Gauntlett, 7621 Herricks Loop, Orlando, FL (US) 32835

( * ) Notice: Subject to any disclaimer, the term of this patent is extended or adjusted under 35 U.S.C. 154(b) by 721 days.

(21) Appl. No.: 11/373,840

(22) Filed: Mar. 10, 2006

(51) Int. Cl.
 *F25D 3/21* (2006.01)
(52) U.S. Cl. .............................. 62/420; 62/414; 62/419; 62/186
(58) Field of Classification Search .................... 62/420, 62/407, 327, 404, 165, 454, 337, 186, 419, 62/414
See application file for complete search history.

(56) References Cited

U.S. PATENT DOCUMENTS 3,961,496 A * 6/1976 Ku ................................ 62/459
4,841,742 A * 6/1989 Biby ............................ 62/420
5,197,301 A * 3/1993 Holcomb ................... 62/457.1
6,571,574 B1 * 6/2003 Blackstone .................. 62/420

* cited by examiner

*Primary Examiner*—Melvin Jones
(74) *Attorney, Agent, or Firm*—Allen, Dyer, Doppelt, Milbrath & Gilchrist, P.A.

(57) ABSTRACT

A portable cooling apparatus and associated method include an ice chest having an inner cavity defined by one or more side walls extending upwardly from a floor forming a lower end of the ice chest and having a lid positioned at an upper end of the ice chest so as to close access to the inner cavity; a manifold removably positioned on the floor of the inner cavity of the ice chest, the manifold having an inlet and an outlet extending through the one or more side walls to outside the ice chest; and an electric fan associated with the manifold outlet for drawing air from the inlet through the manifold so as to blow air through the outlet.

18 Claims, 8 Drawing Sheets

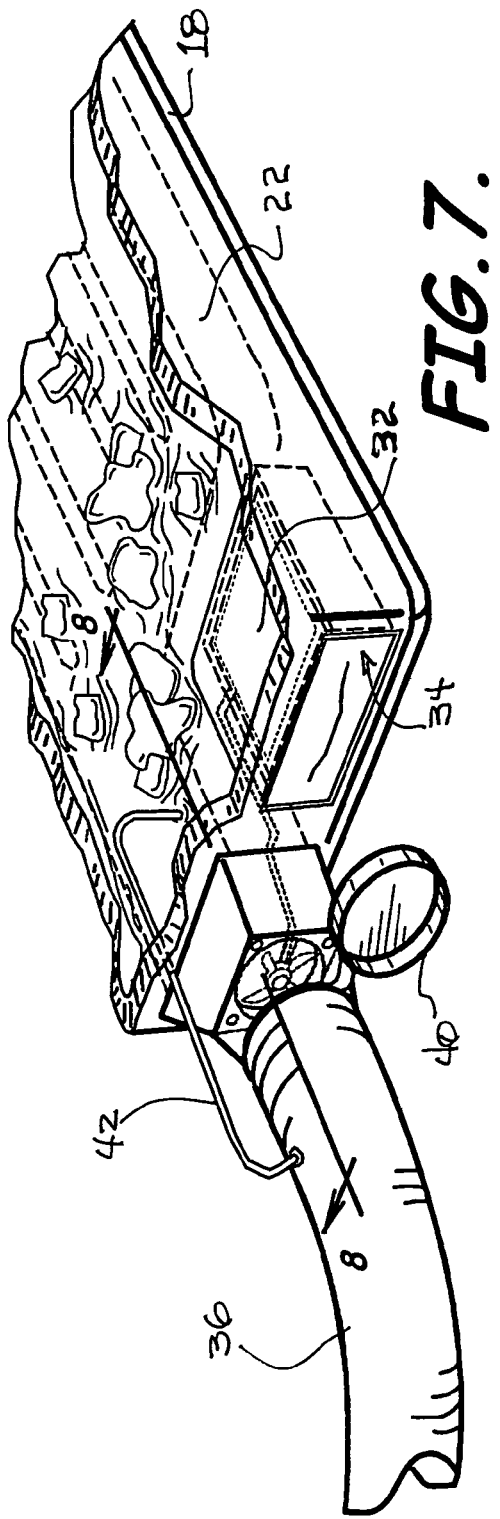
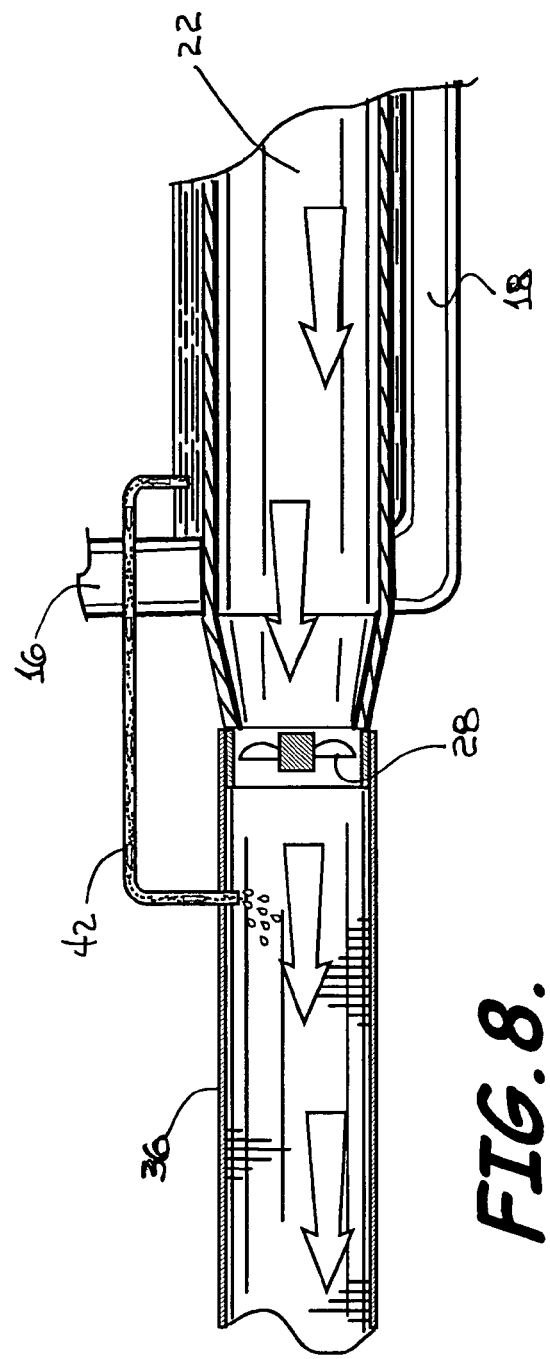

ICE CHEST COOLER AND TEMPORARY AIR CONDITIONER

FIELD OF THE INVENTION

The present invention relates to the field of ice chest coolers and, more particularly, to a cooler which also doubles as a temporary air conditioner.

BACKGROUND OF THE INVENTION

Ice coolers and ice chests have been used for many years to preserve food and beverages in situations in which there is no electrical power available for running regular refrigeration equipment. Ice chests are very popular in outdoor activities such as camping, fishing, boating, picnicking, sports events, music concerts, and others.

In particular, ice coolers have been previously adapted for the dual role of not only providing cold storage for food and drink, but also for providing artificially cooled air and/or cooled water for spraying or misting a user who may need relief from the heat.

Examples of the use of an ice chest or ice cooler in providing temporary air cooling are found in the following inventions. An ice chest having a water spray for misting a user was described in U.S. Pat. No. 6,463,756, issued to Lewis on Oct. 15, 2002, for Combined Ice Chest And Personal Cooling Apparatus. Cooling System For Ice Chest was granted U.S. Pat. No. 6,336,341 on Jan. 8, 2002, and was developed by McGraw et al. On Jun. 3, 2003, U.S. Pat. No. 6,571,568 issued to Link for Portable Air Conditioning Apparatus, an ice cooler based invention.

The designs noted above, however, are inefficient and do not take full advantage of the air cooling power which may be derived from a typical ice chest.

SUMMARY OF THE INVENTION

With the foregoing in mind, the present invention advantageously provides a portable cooling apparatus. In one preferred embodiment, the invention includes an ice chest having an inner cavity, a plurality of side walls, and a floor forming a lower end of the ice chest and having a lid positioned at an upper end of the ice chest so as to close access to the inner cavity. A manifold is associated with the floor of the inner cavity of the ice chest, the manifold having inlet and an outlet openings. An electric fan is associated with the manifold so as to convey air from the inlet through the manifold to blow out through the outlet, the air being cooled as it moves through the manifold. At least one power source is enclosed in a substantially water proof housing and is associated with the ice chest, the at least one power source operably connected with the electric fan.

BRIEF DESCRIPTION OF THE DRAWINGS

Some of the features, advantages, and benefits of the present invention having been stated, others will become apparent as the description proceeds when taken in conjunction with the accompanying drawings, presented solely for exemplary purposes and not with intent to limit the invention thereto, and in which:

FIG. 7 shows a cutaway detailed view of the blower and air outlet opening of the apparatus of FIG. 1 with an added mister;

FIG. 8 is a cross sectional view along line 8-8 of the apparatus shown in FIG. 7.

DETAILED DESCRIPTION OF THE PREFERRED EMBODIMENT

Figure 1:
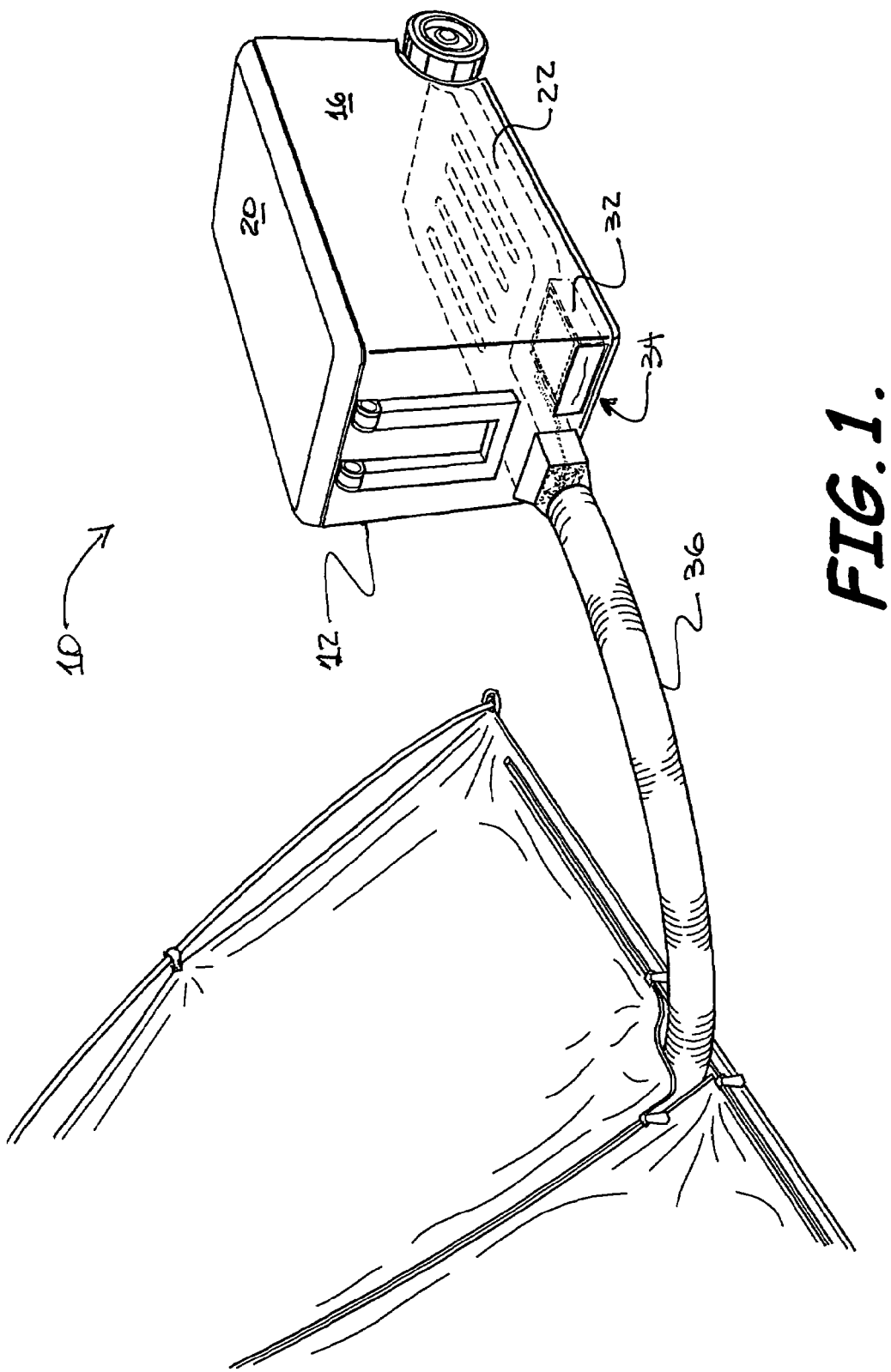
FIG. 1 is an overall environmental view of a portable cooling apparatus in use according to an embodiment of the present invention.
Figure 2:
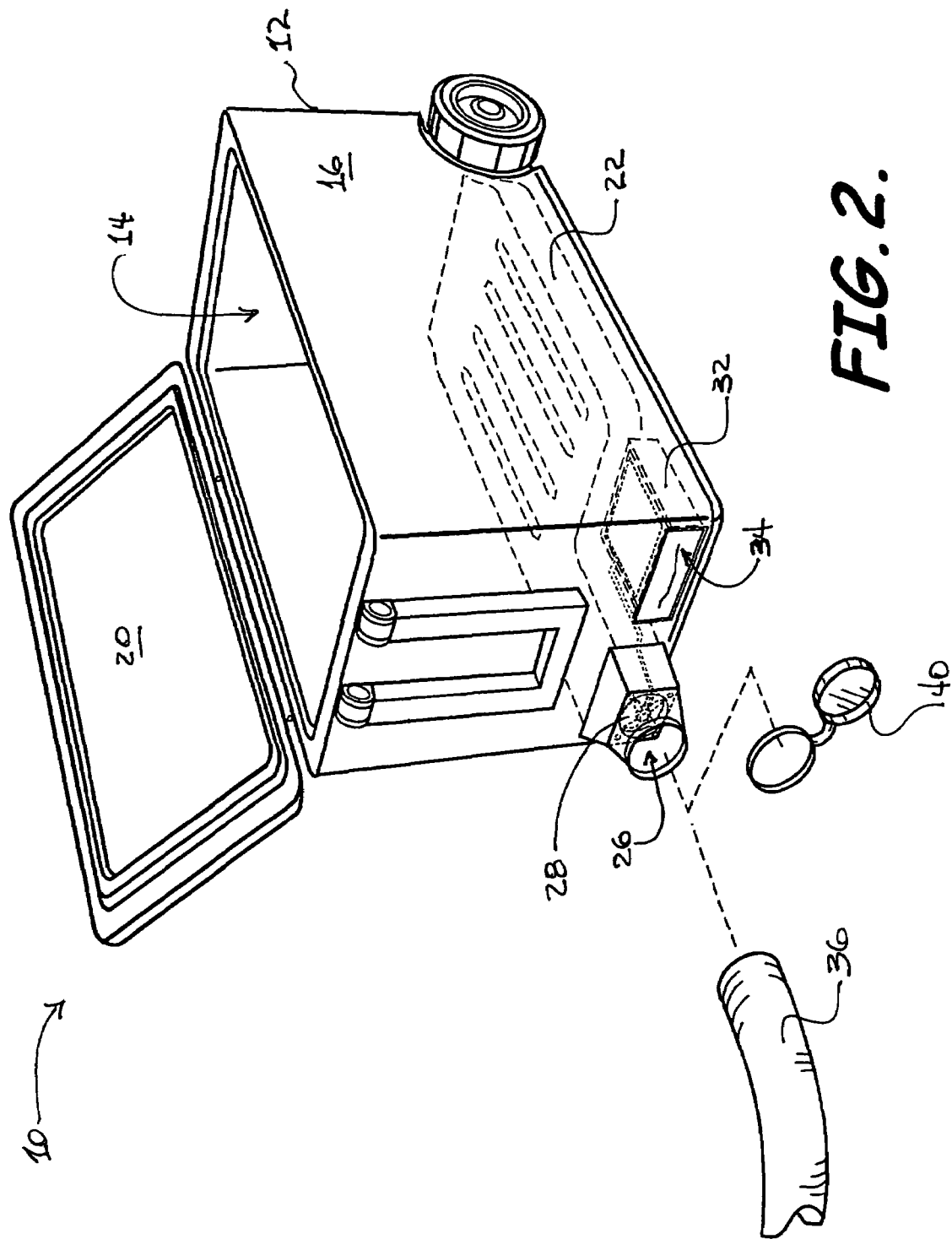
FIG. 2 shows a front perspective view of the ice chest of FIG. 1.

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

FIGS. 1 through 9 illustrate a portable cooling apparatus and its associated methods, according to the present invention. In a first preferred embodiment, as shown in use in FIG. 1, the apparatus includes an ice chest 12 having an inner cavity 14 defined by one or more side walls 16 extending upwardly from a floor 18 forming a lower end of the ice chest and having a lid 20 positioned at an upper end of the ice chest so as to close access to the inner cavity. As seen in FIGS. 1-6, a manifold 22 is removably positioned on the floor 18 of the inner cavity 14 of the ice chest 12, the manifold having an inlet 24 and an outlet 26 extending through the one or more side walls 16 to outside the ice chest. An electric fan 28 is preferably associated with the manifold outlet 26 for moving ambient air through the inlet 24, through the manifold 22 and through the outlet. Details of the fan 28 are shown in FIGS. 2, 4 and 6-8. The fan 28 could instead be associated with the air inlet 24 to push air through the manifold 22, or there could be even two fans working in concert, one at the inlet and one at the outlet 26. The skilled will recognize that as the air moves from the inlet 24 through the manifold 22 it will be cooled by the time it is expelled through the outlet 26, as shown in cross sectional view in FIG. 6.

Figure 3:
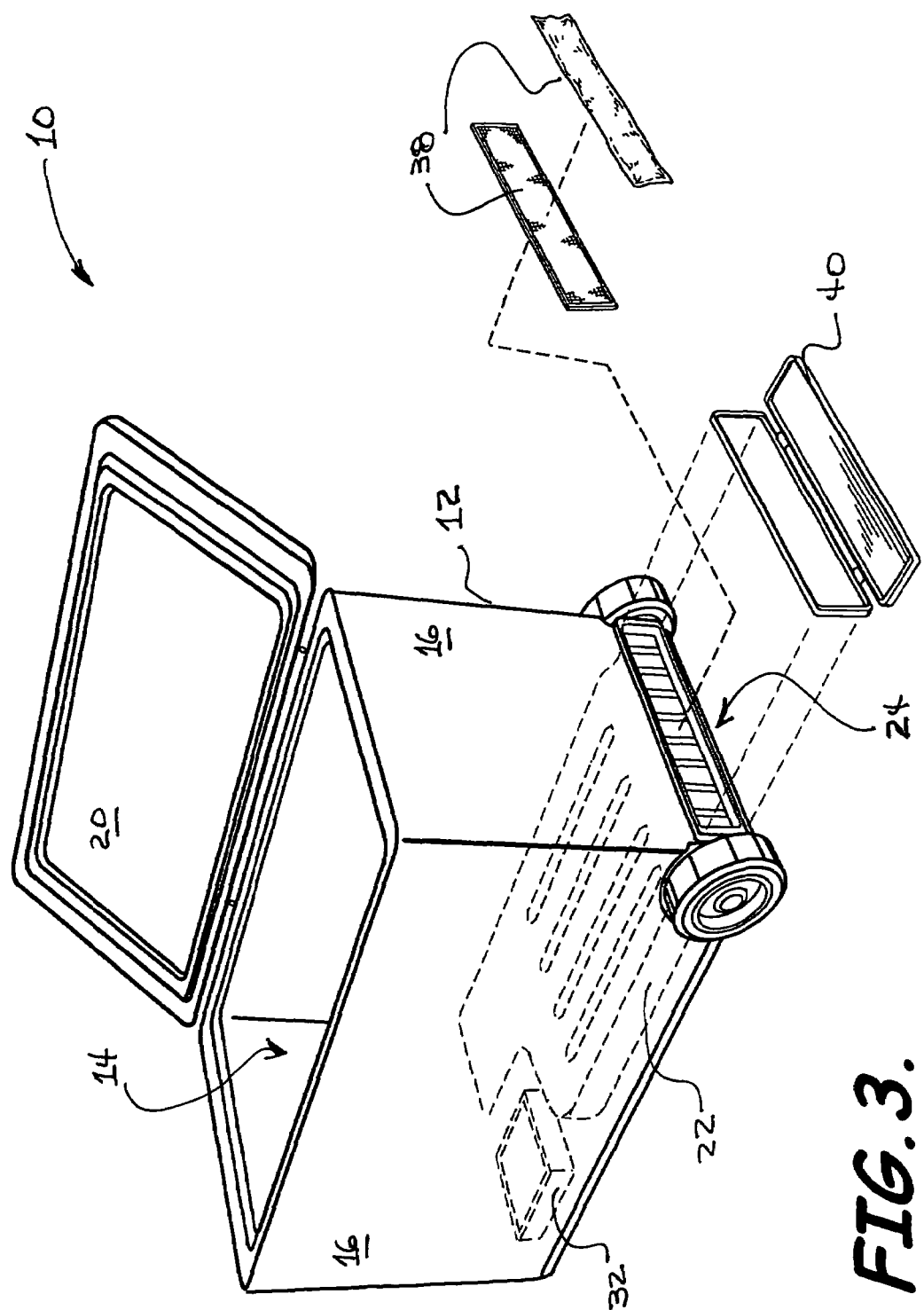
FIG. 3 depicts a rear perspective view of the ice chest of FIG. 1.
Figure 4:
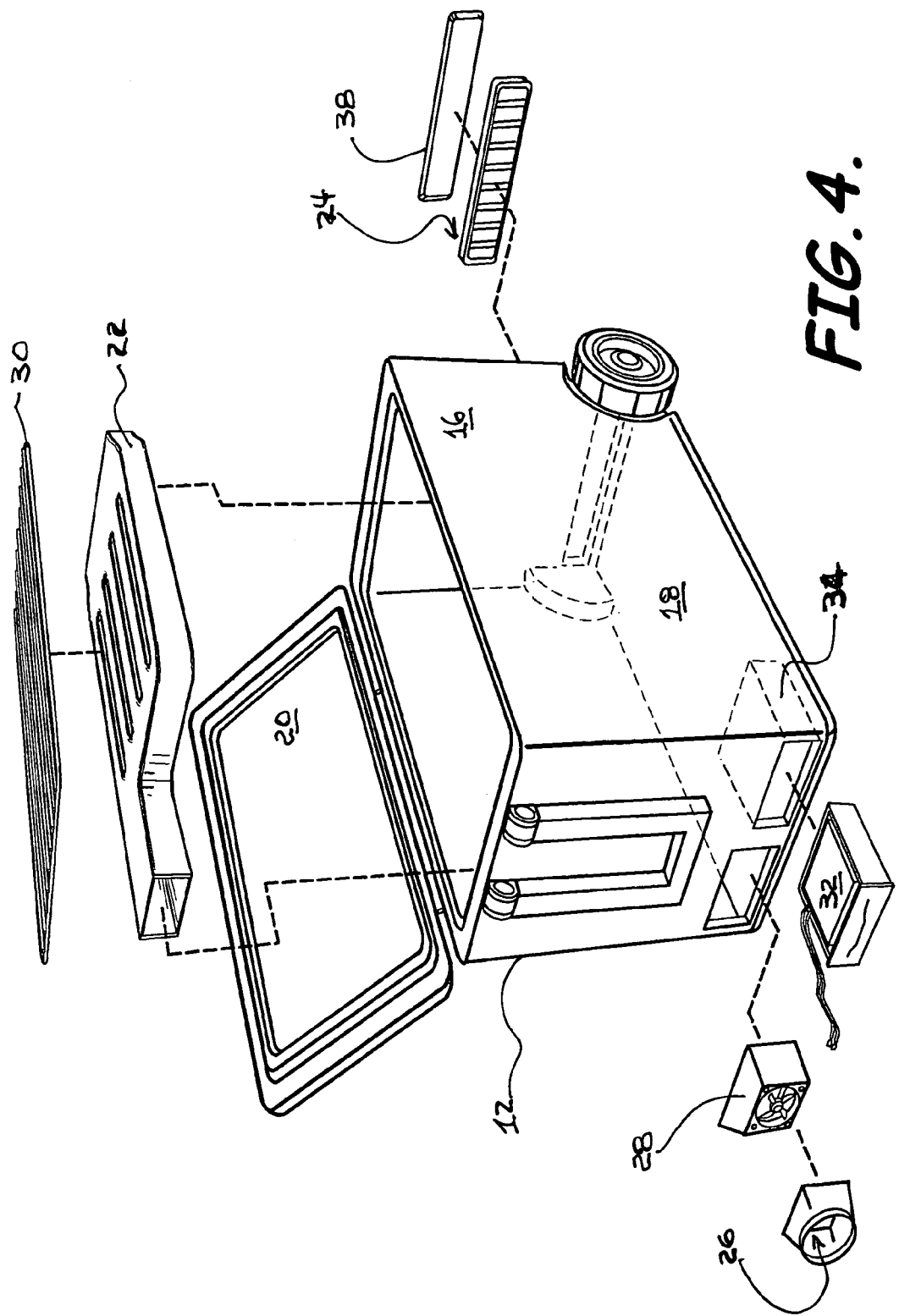
FIG. 4 shows an exploded view of the portable cooling apparatus depicted in FIG. 1.
Figure 5:
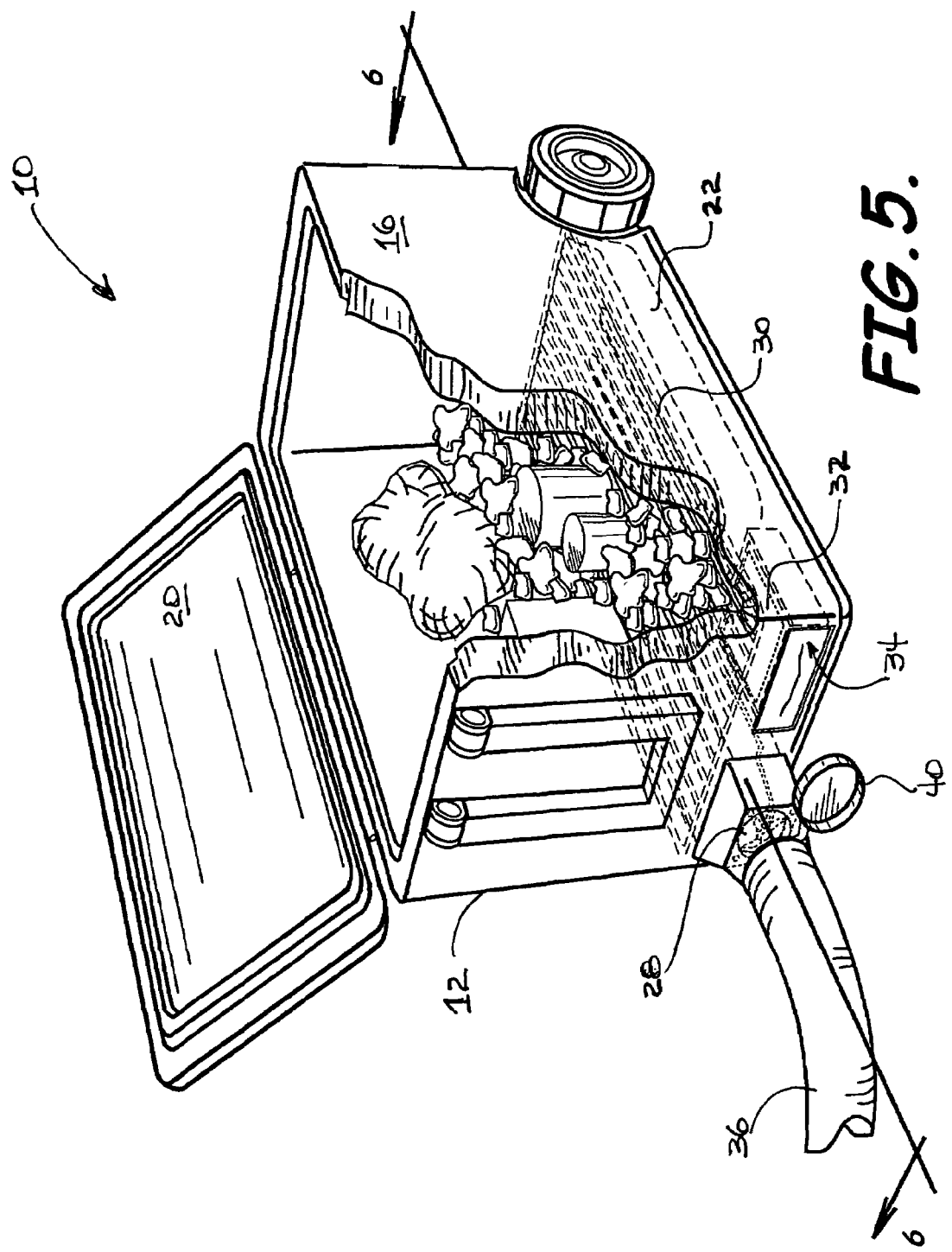
FIG. 5 illustrates the apparatus of FIG. 1 in a perspective cutaway view.
Figure 6:
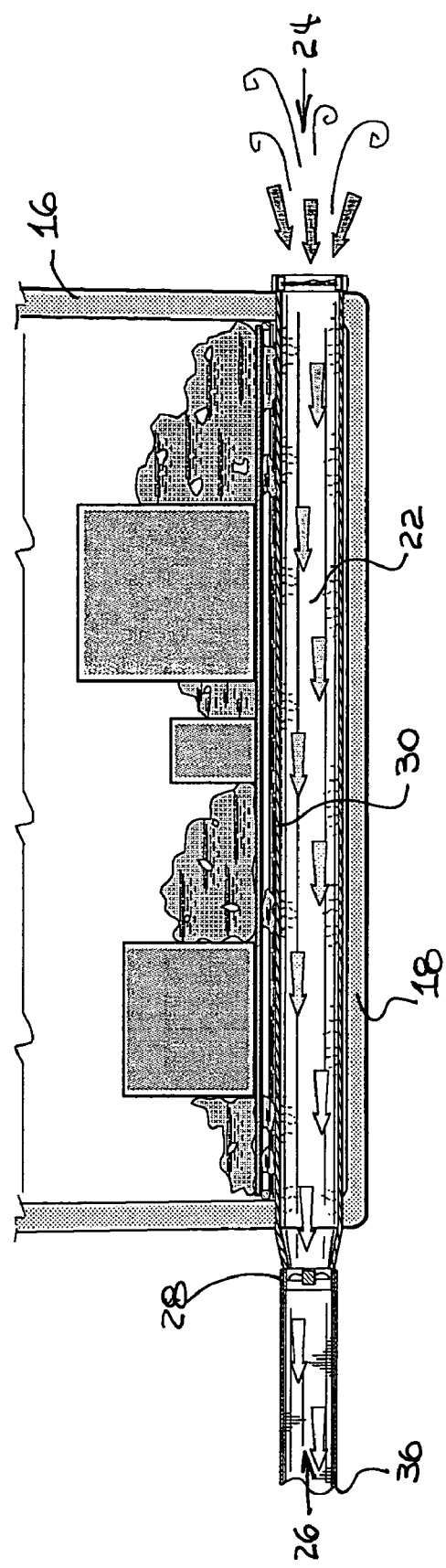
FIG. 6 is a cross sectional view showing the apparatus cut along line 6-6 of FIG. 5.
Figure 9:
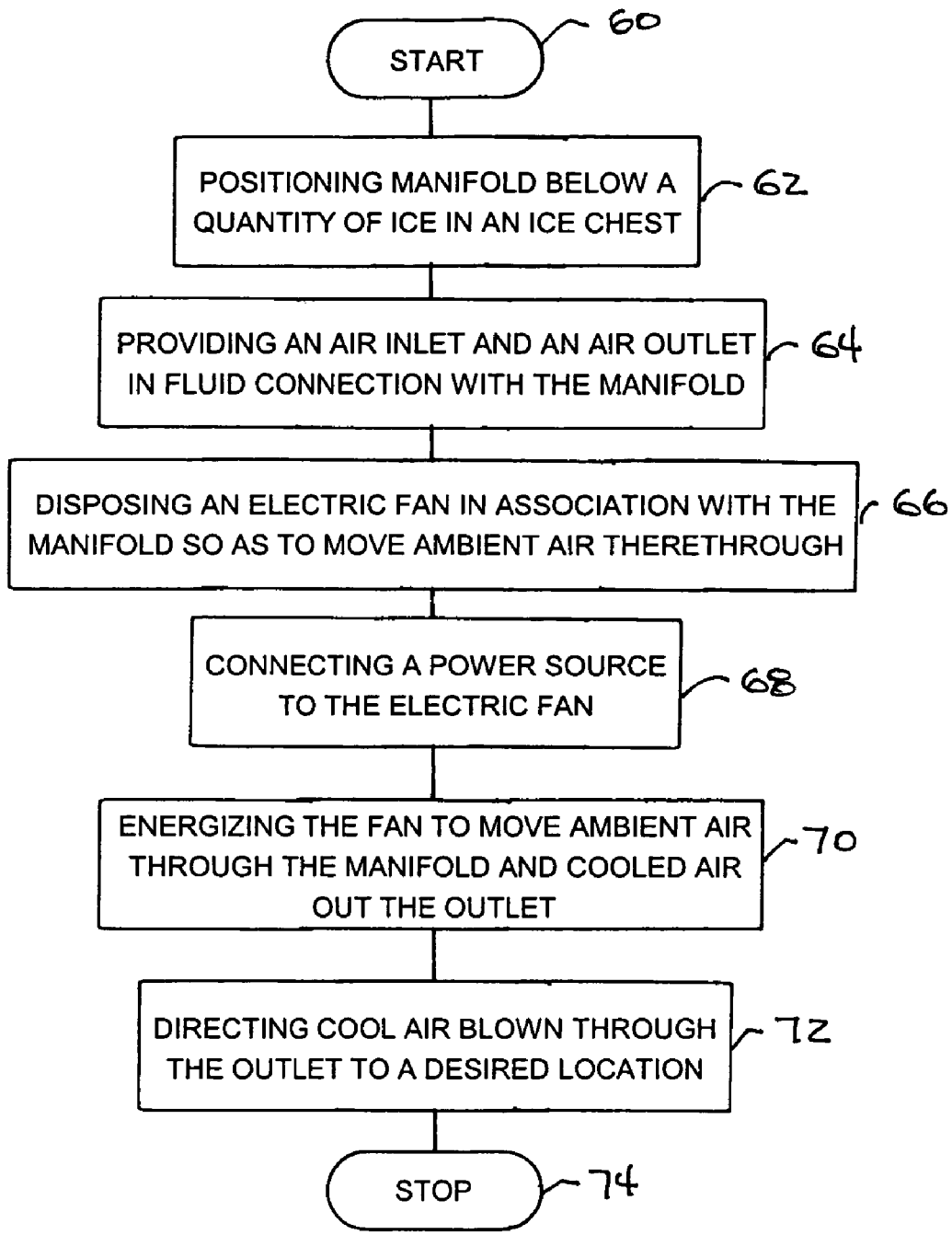
FIG. 9 shows a block diagram illustrating the method of the invention.

Optional features of the present invention include wherein the portable cooling apparatus 10 may further comprise a grate 30 overlying the manifold 22, as illustrated particularly in FIG. 4 and also in FIG. 6, so as to provide support for one or more items stored in the inner cavity 14 of the ice chest 12. Moreover, the portable cooling apparatus 10 could further comprise a power source 32 associated with the ice chest 12, the power source having the electric fan 28 operably connected therewith. The power source is best shown in FIGS. 1-4 and, particularly, in FIG. 7. The portable cooling apparatus may include one or more batteries as a power source 32, the batteries positioned in a substantially water proof housing 34 associated with the ice chest 12 and operably connected with the electric fan 28. Of course, the power source 32 could also be a source of alternating current (AC) and the apparatus 10 could include an electrical cord for connecting to the power source. It may be advantageous to have the apparatus 10 include the capability of alternatively using either type of power, direct current (DC) from one or more batteries, or AC from an electrical outlet.

Those skilled in the art will recognize that in an embodiment of the invention wherein the inlet 24 and outlet 26 of the manifold 22 extend through the one or more side walls 16 of the ice chest 12, these openings should be structured in a substantially water proof manner. FIGS. 6 and 8 best show the inlet 24 and outlet 26 extending through side walls 16 of the ice chest 12. Additionally, for improved air cooling, the manifold 22 could comprise metal and may be made entirely of metal, which is a material known for efficient heat transfer.

Yet additionally, the portable cooling apparatus 10 of the present invention could advantageously include a conduit 36 connected to the air outlet 26 so as to allow a user to convey blown cooled air in a desired direction. More preferably, this conduit 36 could be a flexible conduit, such as flexible hose, connected to the outlet 26 for conveying the blown cooled air in the desired direction, for example, into a tent, as illustrated in FIG. 1. Additional views of a conduit 36 connected to the outlet 26 are shown in FIGS. 6-8. Moreover, as seen in FIGS. 3, 4 and 6, the cooling apparatus 10 may comprise a filter 38 associated with the inlet 24 for filtering air drawn into the manifold 22 and may include a filter 38 associated with the outlet 26 for filtering air blown out therethrough. Whether the cooling apparatus 10 includes a filter 38 at all, or one or two filters, may be left to the discretion of the user, since a filter is likely to at least slightly impede the flow of air through the system. In that regard, the skilled will recognize that the filter could be nothing more elaborate than a bug screen to prevent insects from entering the air system. A cap 40 may be provided to close the inlet 24 and/or outlet 26.

In another embodiment of the invention, the cooling apparatus 10 comprises an ice chest 12 having an inner cavity 14, a plurality of side walls 16, and a floor 18 forming a lower end of the ice chest and having a lid 20 positioned at an upper end of the ice chest so as to close access to the inner cavity. A manifold 22 associated with the floor 18 of the inner cavity 14 of the ice chest 12 has an inlet 24 and an outlet 26 and an electric fan 28 associated with the manifold so as to convey air from the inlet through the manifold to blow out through the outlet. This embodiment differs from the others in that it includes at least one power source 32 enclosed in a substantially water proof housing 34 associated with the ice chest 12, the at least one power source being operably connected with the electric fan 28, a preferred power source in this embodiment being one or more batteries.

Optional features in this embodiment also include a grate 30 overlying the manifold 22 in the inner cavity 14 of the chest 12 so as to provide support for one or more items stored in the ice chest. Also in this embodiment of the invention, the manifold 22 is best positioned within the floor 14 of the ice chest, rather than on top of the floor, and preferably is made of metal. This embodiment is best seen in FIG. 6. As noted above, a conduit 36 may be connected to the outlet 26 so as to convey blown air to a desired location, the conduit preferably being a flexible conduit. A filter 38, as discussed above, may be associated with the inlet 24 for filtering air drawn into the manifold or with the outlet 26 for filtering air blown out.

As shown in FIGS. 7 and 8, the invention includes an optional feature which injects a mist of cold water into the airflow being blown through the outlet 26 of the portable cooling apparatus 10. A connection may be made between the floor 18 of the ice chest 12, where cold water collects, and the outlet 26, so that the airflow creates a Venturi effect and generates a mist of cold water carried in the air outflow. As shown in FIGS. 7 and 8, this connection is by a small tube 42 which is outside the manifold 22 and the conduit 36. The connection, however, could be made in other ways as known to the skilled, with care given to prevent cold water from undesirably leaking out of the ice chest. As shown, the misting tube 42 extends above the water level in the ice chest 12 so as to avoid draining the water.

The invention also includes an associated method. As shown in the block diagram of FIG. 9, the method from the start 60 calls for providing portable air cooling by positioning a manifold 62 below a quantity of ice held in an ice chest so that the manifold is cooled and is bathed in cold water as the ice melts. The method also includes providing an air inlet and an air outlet 64 on the ice chest, both inlet and outlet being in fluid connection with the manifold and disposing an electric fan 66 in association with the manifold so as to move ambient air through the inlet, through the manifold and through the outlet. The method also calls for connecting a power source to the electric fan 68, the power source being carried in a substantially water proof housing associated with the ice chest. Energizing the fan 70 activates the flow of cooled air out the outlet and is followed by directing cool air blown through the outlet 72 to a desired location, such as into a camping tent. Thereafter, the method stops at 74. Optional features in the method are as noted above for the apparatus.

From this detailed description, those skilled in the art will appreciate that the present portable cooling apparatus 10 locates the air manifold 22 on or within the floor 18 of the cooler 12. This location requires, then, that the ice be placed above or on top of or above the manifold 22, so that the cooling power of the ice may be most efficiently transferred to the air manifold. Additionally, as the ice slowly melts over time, the cold melt water passes downwardly in the cooler and bathes the manifold 22 in ice cold water, adding to the efficiency of the present design. In an embodiment in which the air manifold 22 is positioned within the floor 18 of the cooler 12, ice cold water accumulating on the cooler floor helps concentrate the cold directly above the manifold.

Of further advantage, the air moving fan 28 in the present invention is preferably positioned in association with the outlet 26 opening, as seen in FIGS. 6-8. That is, the air moving fan 28 operates most efficiently as an exhaust fan, rather than as an intake fan. It has been found that air moves more easily through the manifold 22 when the fan 28 pulls air through the manifold, rather than when it pushes air. Additionally, one or more filters 38 may be positioned on the air inlet 24 and on the air outlet 26, so as to keep the air manifold and conduit clean, free of debris and prevent bugs from entering the air system.

The present portable cooling apparatus also includes a conduit 36 connected to the air outlet, so that cooled air may be conducted to any desired location. For example, as shown in FIG. 1, the outlet conduit 36 may be a flexible hose which could be used to pump cooled air into a camping tent, thereby making summer camping much more bearable, particularly for sleeping.

As shown and described, the skilled will readily appreciate that in the present invention the lid 20 of the ice chest is unencumbered by any of the components which move, power, handle or cool the air. All of the components of the present invention are most preferably located at the lower end of the cooler 12, essentially occupying little or no room in the ice chest's 12 food storage area and concentrating the weight of these components low in the ice chest for increased stability. Preferably, the cooler 12 includes wheels, as shown in the figures, for easy transportability of the apparatus.

It should be recognized that there is no reason why campers could not employ the ice chest 12 of the present invention as a fully dedicated portable air conditioner by filling it completely full of ice and using it strictly for providing cool air, rather than for food storage. This would greatly extend the time during which the portable cooling apparatus 10 would continue to provide cool air. Similarly, cool air could be piped into a vehicle where campers are sleeping, so as to avoid the danger of running the vehicle's engine or a gasoline-powered generator. Likewise, the present portable cooling 10 apparatus could be used to cool a boat's cabin or any other enclosed area.

Accordingly, in the drawings and specification there have been disclosed typical preferred embodiments of the invention and, although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as recited in the appended claims.

That which is claimed:

1. A portable cooling apparatus providing a cooler and a temporary air conditioner, said apparatus comprising:
    an ice chest having an inner cavity defined by one or more side walls extending upwardly from a floor forming a lower end of said ice chest and having a lid positioned at an upper end of said ice chest so as to close access to the inner cavity;
    a manifold removably lying along the floor of the inner cavity of said ice chest so as to be at a lower end of the inner cavity leaving cold storage space in the inner cavity, said manifold having a plurality of conduits in closed fluid connection between an inlet and an outlet both of which extend through said one or more side walls to outside said ice chest; and
    an electric fan associated with the manifold for conveying air from the inlet through said manifold so as to blow the air through the outlet.

2. The portable cooling apparatus of claim 1, further comprising a grate overlying said manifold so as to provide support for one or more items stored in the inner cavity of said ice chest.

3. The portable cooling apparatus of claim 1, further comprising a power source associated with said ice chest, said power source having said electric fan operably connected therewith.

4. The portable cooling apparatus of claim 1, further comprising one or more batteries positioned in a substantially water proof housing associated with said ice chest and operably connected with said electric fan.

5. The portable cooling apparatus of claim 1, wherein the inlet and outlet of said manifold extend through said one or more side walls of said ice chest in a substantially water proof manner.

6. The portable cooling apparatus of claim 1, wherein said manifold comprises metal.

7. The portable cooling apparatus of claim 1, further comprising a conduit connected to the outlet so as to convey blown air in a desired direction.

8. The portable cooling apparatus of claim 1, further comprising:
    a flexible conduit connected to the outlet for conveying blown air in a desired direction.

9. The portable cooling apparatus of claim 1, further comprising a filter associated with the inlet for filtering air drawn into said manifold.

10. The portable cooling apparatus, of claim 1, further comprising a filter associated with the outlet for filtering air blown out therethrough.

11. A portable cooling apparatus comprising:
    an ice chest having an ice storage inner cavity, a plurality of side walls, and a floor forming a lower end of said ice chest and having a lid so as to close access to the inner cavity;
    a manifold positioned having said ice storage inner cavity above and having an inlet and an outlet with a plurality of conduits extending in closed fluid connection therebetween; and
    an electric fan associated with the manifold so as to convey outside air from the inlet through said manifold to blow out through the outlet.

12. The portable cooling apparatus of claim 11, wherein said manifold is positioned in the inner cavity having a grate overlying said manifold so as to provide support for one or more items stored in the inner cavity of said ice chest.

13. The portable cooling apparatus of claim 11, wherein said manifold is positioned within the floor of the ice chest.

14. The portable cooling apparatus of claim 11, wherein the manifold comprises metal.

15. The portable cooling apparatus of claim 11, further comprising a conduit connected to the outlet so as to convey blown air to a desired location.

16. The portable cooling apparatus of claim 11, further comprising:
    a flexible conduit connected to the outlet for conveying blown air in a desired direction.

17. The portable cooling apparatus of claim 11, further comprising a filter associated with the inlet for filtering air drawn into said manifold.

18. The portable cooling apparatus of claim 11, further comprising a filter associated with the outlet for filtering air blown out therethrough.

* * * * *